(12) United States Patent
Yao et al.

(10) Patent No.: US 12,118,131 B2
(45) Date of Patent: Oct. 15, 2024

(54) MASK INCLUDING A MOVEABLE WINDOW FOR VIEWING CONTENT

(71) Applicant: Citrix Systems, Inc., Fort Lauderdale, FL (US)

(72) Inventors: Peng Yao, Nanjing (CN); Tianyu Xiao, Nanjing (CN)

(*) Notice: Subject to any disclaimer, the term of this patent is extended or adjusted under 35 U.S.C. 154(b) by 1002 days.

(21) Appl. No.: 17/060,407

(22) Filed: Oct. 1, 2020

(65) Prior Publication Data

US 2022/0067220 A1 Mar. 3, 2022

Related U.S. Application Data

(63) Continuation of application No. PCT/CN2020/112314, filed on Aug. 29, 2020.

(51) Int. Cl.
*G06F 21/84* (2013.01)
*G06F 3/01* (2006.01)
(Continued)

(52) U.S. Cl.
CPC .............. *G06F 21/84* (2013.01); *G06F 3/013* (2013.01); *G06F 3/0481* (2013.01); *G06V 10/40* (2022.01);
(Continued)

(58) Field of Classification Search
CPC ........ G06F 21/84; G06F 3/013; G06F 3/0481; G06F 2203/04804; G06F 21/629;
(Continued)

(56) References Cited

U.S. PATENT DOCUMENTS 5,801,697 A 9/1998 Parikh et al.
5,999,177 A * 12/1999 Martinez ............... G06F 3/0483
715/235

(Continued)

FOREIGN PATENT DOCUMENTS

CN 102663056 A * 9/2012
CN 103164103 A * 6/2013
(Continued)

OTHER PUBLICATIONS

Janet H. Hsiao, "Understanding the collinear masking effect in visual search through eye tracking", Brief Report Published: Jun. 9, 2021, vol. 28, pp. 1933-1943, (2021), 11 pages (Year: 2021).*
(Continued)

*Primary Examiner* — Shahriar Zarrineh

(57) ABSTRACT

Techniques are disclosed for providing protection of sensitive information during the display of the sensitive information on a display. An example methodology implementing the techniques includes, by a computing device, receiving content for display on a display of the computing device and generating a mask for display over the content within the display, the mask including a window so that a portion of the content located within the window is viewable via the display, and content outside the window is not viewable via the display. The method also includes, by the computing device, applying the mask over the content so that the content can be read by moving the window over the content to display individual pieces of the content without display of the content in its entirety.

17 Claims, 12 Drawing Sheets

(51) Int. Cl.
  *G06F 3/0481* (2022.01)
  *G06V 10/40* (2022.01)
  *G09G 5/377* (2006.01)
  *G06V 30/10* (2022.01)
(52) U.S. Cl.
  CPC ............ *G09G 5/377* (2013.01); *G06V 30/10* (2022.01); *G09G 2354/00* (2013.01)
(58) Field of Classification Search
  CPC ...... G06V 10/40; G06V 30/10; G06V 40/193; G09G 5/377; G09G 2354/00; G09G 2358/00
  See application file for complete search history.

(56) References Cited

U.S. PATENT DOCUMENTS

| | | |
|---|---|---|
| 6,429,883 B1 | 8/2002 | Plow et al. |
| 6,806,892 B1 * | 10/2004 | Plow ................... G06F 3/0481 715/788 |
| 8,185,591 B1 * | 5/2012 | Lewis .................. G06Q 10/107 715/764 |
| 8,799,668 B2 | 8/2014 | Cheng |
| 8,826,169 B1 | 9/2014 | Yacoub et al. |
| 9,466,266 B2 | 10/2016 | Hildreth et al. |
| 9,710,887 B1 * | 7/2017 | Sahlsten ............... G09G 3/003 |
| 9,767,585 B1 | 9/2017 | Carter, Jr. et al. |
| 10,325,103 B1 | 6/2019 | Austin et al. |
| 10,511,698 B1 | 12/2019 | Chen |
| 2001/0038393 A1 * | 11/2001 | Crain ................... G06F 16/955 715/744 |
| 2004/0174336 A1 * | 9/2004 | Bohn ................... G06F 3/0312 345/156 |
| 2004/0212587 A1 * | 10/2004 | Kong ................... G06F 3/038 345/156 |
| 2005/0259077 A1 * | 11/2005 | Adams ................. G06F 3/0362 345/163 |
| 2009/0257591 A1 | 10/2009 | Mithal et al. |
| 2009/0259967 A1 | 10/2009 | Davidson et al. |
| 2010/0045570 A1 | 2/2010 | Takata |
| 2010/0235857 A1 * | 9/2010 | Lestage ................ G11B 27/036 348/E5.062 |
| 2011/0102455 A1 * | 5/2011 | Temple .................. G06F 3/017 345/619 |
| 2011/0265031 A1 * | 10/2011 | Chiu ....................... G06F 40/58 715/790 |
| 2012/0098639 A1 | 4/2012 | Ijas |
| 2012/0223934 A1 * | 9/2012 | Takami .................... G06F 3/14 345/418 |
| 2013/0093794 A1 * | 4/2013 | Dairman ................ G01C 23/00 345/672 |
| 2013/0298076 A1 | 11/2013 | Rice et al. |
| 2014/0201527 A1 | 7/2014 | Krivorot |
| 2014/0259184 A1 | 9/2014 | Hoyer |
| 2014/0285422 A1 * | 9/2014 | Kang ..................... G09G 5/003 345/156 |
| 2014/0331171 A1 * | 11/2014 | Shah ................. H04M 1/72445 715/790 |
| 2015/0067594 A1 * | 3/2015 | Choi ..................... G06F 3/0488 715/808 |
| 2015/0074506 A1 | 3/2015 | Dunn et al. |
| 2015/0089414 A1 * | 3/2015 | Park ....................... G06F 3/0485 715/765 |
| 2015/0113666 A1 | 4/2015 | Buck |
| 2015/0200922 A1 | 7/2015 | Eschbach et al. |
| 2015/0334162 A1 * | 11/2015 | Krishnamurthy ..... G06F 3/0485 715/740 |
| 2016/0011731 A1 | 1/2016 | Pasquero et al. |
| 2016/0078247 A1 | 3/2016 | Tucker et al. |
| 2016/0112209 A1 | 4/2016 | Yoon et al. |
| 2016/0307002 A1 | 10/2016 | Zha |
| 2017/0351909 A1 | 12/2017 | Kaehler |
| 2018/0074667 A1 * | 3/2018 | Karunamuni ......... G06F 40/134 |
| 2018/0164589 A1 | 6/2018 | Watanabe et al. |
| 2018/0189461 A1 | 7/2018 | Ghafourifar et al. |
| 2018/0189504 A1 | 7/2018 | Ghafourifar et al. |
| 2018/0189505 A1 | 7/2018 | Ghafourifar et al. |
| 2018/0225019 A1 | 8/2018 | Xie |
| 2019/0068687 A1 | 2/2019 | Masi et al. |
| 2019/0147169 A1 | 5/2019 | Adams et al. |
| 2019/0187870 A1 * | 6/2019 | Bostick ............... G06F 3/04886 |
| 2019/0220609 A1 | 7/2019 | Ghazanfari |
| 2019/0289419 A1 | 9/2019 | Eronen et al. |
| 2020/0151348 A1 * | 5/2020 | Chauhan ................ H04L 67/53 |
| 2020/0151955 A1 * | 5/2020 | Chauhan ............. H04N 13/296 |
| 2020/0335032 A1 * | 10/2020 | Kiik ...................... H04N 23/20 |
| 2021/0385067 A1 * | 12/2021 | Yarabolu ............... H04L 9/3231 |

FOREIGN PATENT DOCUMENTS

| | | | | |
|---|---|---|---|---|
| CN | 110489043 A | * | 11/2019 | ........... G06F 1/1616 |
| CN | 110502936 A | * | 11/2019 | |
| JP | 2003295806 A | * | 10/2003 | |
| JP | 3478172 B2 | * | 12/2003 | ........... G06F 3/0481 |
| JP | 4597611 B2 | * | 12/2010 | |
| JP | 2011223163 A | * | 11/2011 | |
| JP | 2012230650 A | * | 11/2012 | |
| TW | 1386843 B | * | 2/2013 | |
| WO | WO-2013104377 A1 | * | 7/2013 | ............. G02B 27/01 |
| WO | WO-2020174398 A1 | * | 9/2020 | ............. A61B 90/37 |

OTHER PUBLICATIONS

PCT International Search Report and Written Opinion dated May 27, 2021 for International Application No. PCT/CN2020/112314; 9 pages.
European Search Report and Written Opinion dated Mar. 31, 2020 for EP Application No. 19207955.6; 9 Pages.
U.S. Non-Final Office Action dated Jun. 6, 2019 for U.S. Appl. No. 16/185,724; 11 Pages.
U.S. Final Office Action dated Oct. 23, 2019 for U.S. Appl. No. 16/185,724; 12 Pages.
U.S. Non-Final Office Action dated Mar. 24, 2020 for U.S. Appl. No. 16/185,724; 11 Pages.
U.S. Final Office Action dated Sep. 9, 2020 for U.S. Appl. No. 16/185,724; 11 Pages.
U.S. Non-Final Office Action dated Mar. 15, 2021 for U.S. Appl. No. 16/185,724; 14 pages.

\* cited by examiner

MASK INCLUDING A MOVEABLE WINDOW FOR VIEWING CONTENT

CROSS REFERENCE TO RELATED APPLICATION

This application is a continuation of and claims the benefit of PCT Patent Application No. PCT/CN2020/112314 filed on Aug. 29, 2020 in the English language in the State Intellectual Property Office and designating the United States, the contents of which are hereby incorporated herein by reference in its entirety.

BACKGROUND

Due, at least in part, to the growth of the Internet and the World Wide Web (commonly known as the Web), more and more content is available to more and more people. This network growth has also led to the development of cloud-based services and platforms, and use of such services and platforms by organizations, such as companies, enterprises, governments, and agencies, to implement digital workspace solutions. As a result, it is not uncommon for users to access content, including confidential, proprietary, or otherwise sensitive content, on a large variety of devices, both personal and professional.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include receiving, by a computing device, content for display on a display of the computing device, and generating, by the computing device, a security cover for display over the content within the display, the security cover including a window so that a portion of the content located within the window is viewable via the display, and content outside the window is not viewable via the display. The method may also include applying, by the computing device, the security cover over the content so that the content can be read by moving the window over the content to display individual pieces of the content without display of the content in its entirety.

According to another illustrative embodiment provided to illustrate the broader concepts described herein, a system includes a memory and one or more processors in communication with the memory. The processor may be configured to receive content for display on a display and generate a mask for display over the content within the display, the mask including a window so that a portion of the content located within the window is viewable via the display, and content outside the window is not viewable via the display. The processor may be further configured to apply the mask over the content so that the content can be read by moving the window over the content to display individual pieces of the content without display of the content in its entirety.

According to another illustrative embodiment provided to illustrate the broader concepts described herein, a method may include displaying, by a computing device, content on a display of the computing device, and generating, by the computing device, a mask for display over the content within the display, the mask including a window so that a portion of the content located within the window is viewable via the display, and content outside the window is not viewable via the display. The method may also include applying, by the computing device, the mask over the content so that the content can be read by moving the window over the content to display individual pieces of the content without display of the content in its entirety.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
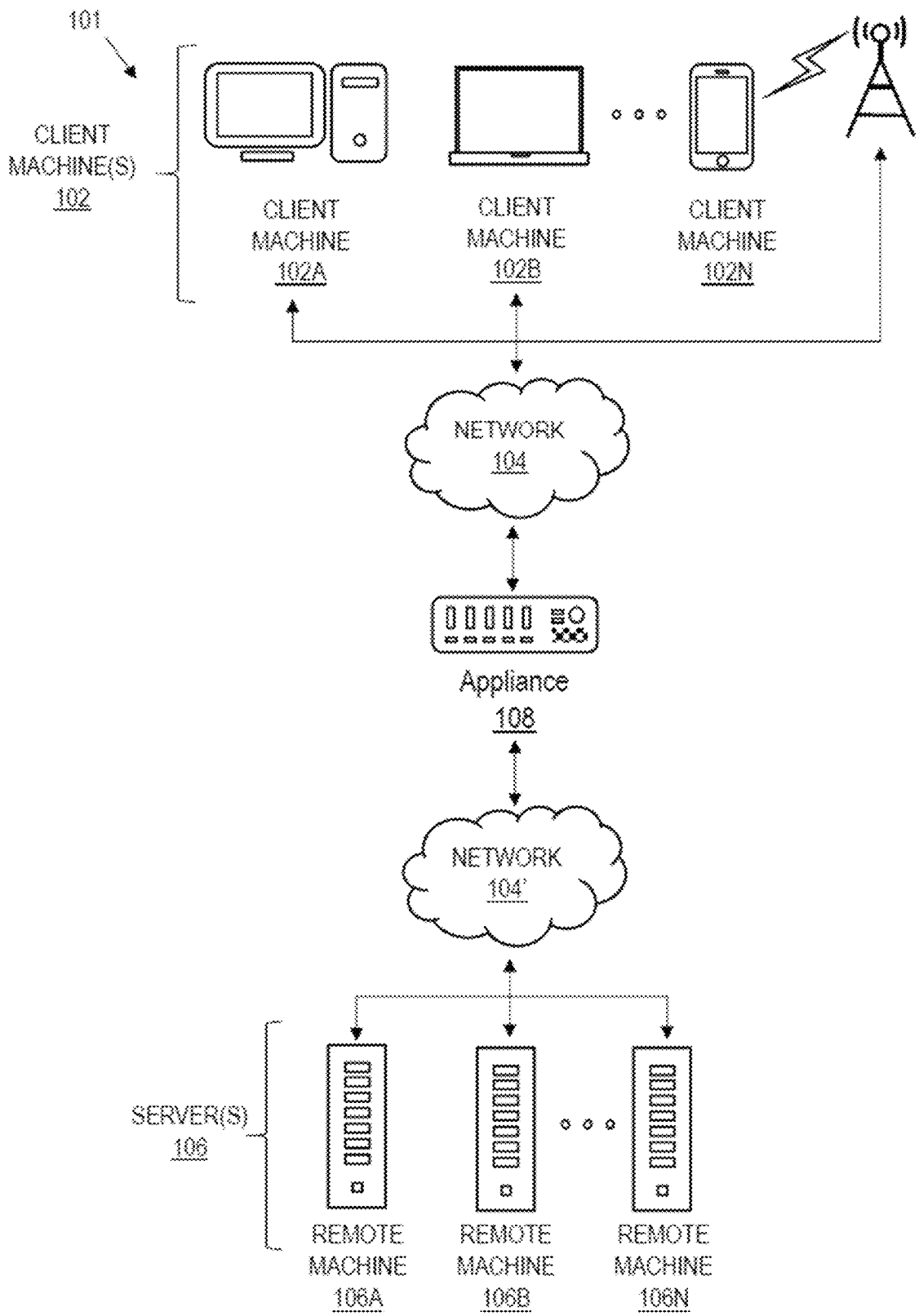
FIG. 1 is a diagram of an illustrative network computing environment in which embodiments of the present disclosure may be implemented.

With the vast amounts of Internet and Web content that is made available, users can access and display data, including sensitive information, using computing devices from any location. Devices used to access sensitive content may have a wide variety of security capabilities and may be used in a wide variety of situations and places, some of which are more secure than others. However, despite the use of such security capabilities, when sensitive information is displayed, there is a risk that such displayed sensitive information may be leaked or otherwise compromised. For example, unauthorized persons nearby the display may be able to view the sensitive information being displayed on the display device.

Concepts, devices, systems, and techniques are disclosed for protection of sensitive information during the display of the sensitive information on a display of a computing device. The protection of the sensitive information on the display is achieved by providing a mask (also referred to as a security cover) that includes a window over the content on the display. The properties of the mask are such that, when the mask is applied over the content on the display, the content located within the window is viewable through the window and the content located outside the window is not viewable (i.e., blocked by the mask). In other words, the mask effectively prevents viewing of the content on the display except through the window. Thus, a user can read the content on the display by moving the window over the content to cause individual pieces of the content to be viewable through the window. However, since the entirety of the content on the display is not viewable through the window, any sensitive information included in the content is protected since another user (e.g., a passerby) viewing the display, or even a screen capture of the display, is not able to comprehend the content displayed through the window due to a lack of context.

In some embodiments, a client application, such as a browser application, running on a client device may be configured to generate and apply a mask over content that is being shown on a display. The mask effectively prevents viewing of the content on the display except through a window included in the mask. In some cases, the content may be displayed (rendered) within a window, such as, for example, an application window or a browser window. In such cases where the content is displayed within a window, the client application may be configured to track changes in the size and or positioning of the underlying window and resize and/or reposition the mask so that the mask is applied over the content in the window. In cases where the content is displayed on the display without the use of a window, the client application may generate and apply a mask over the display.

In some embodiments, the client application may be configured to apply the mask over the content if the content includes sensitive information. In some embodiments, the client application may be configured to size the window based on a size of the display and/or based on a type of content being shown in the display. In some embodiments, the client application may be configured to size the window based on user preference(s) (e.g., user configuration).

In some embodiments, the client application may be configured to control movement of the window within the mask based on detected keyboard input or pointer input. In some embodiments, the client application may be configured to control movement of the window within the mask based on detected eye focus (eye focus location) of a user viewing the display. These and other advantages, variations, and embodiments will be apparent in light of this disclosure.

As used herein, the term "sensitive information", or "sensitive content", or "confidential information", or "confidential content" includes any information or content that is either legally confidential or identified by an individual/organization as being only intended to be seen/viewed by the user themselves, or intended to be seen/viewed by any one or more other persons authorized by this user. Other terms may also be used to refer to information or content that is either legally confidential/sensitive or identified by an individual/organization as being only for the eyes of the user themselves, or any one or more other persons authorized by this user. Non-limiting examples of sensitive information include any data that could potentially be used to identify a particular individual (e.g., a full name, Social Security number, driver's license number, bank account number, passport number, and email address), financial information regarding an individual/organization, information deemed confidential by the individual/organization (e.g., contracts, sales quotes, customer contact information, phone numbers, personal information about employees, and employee compensation information), and information classified by a governing authority as being confidential.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
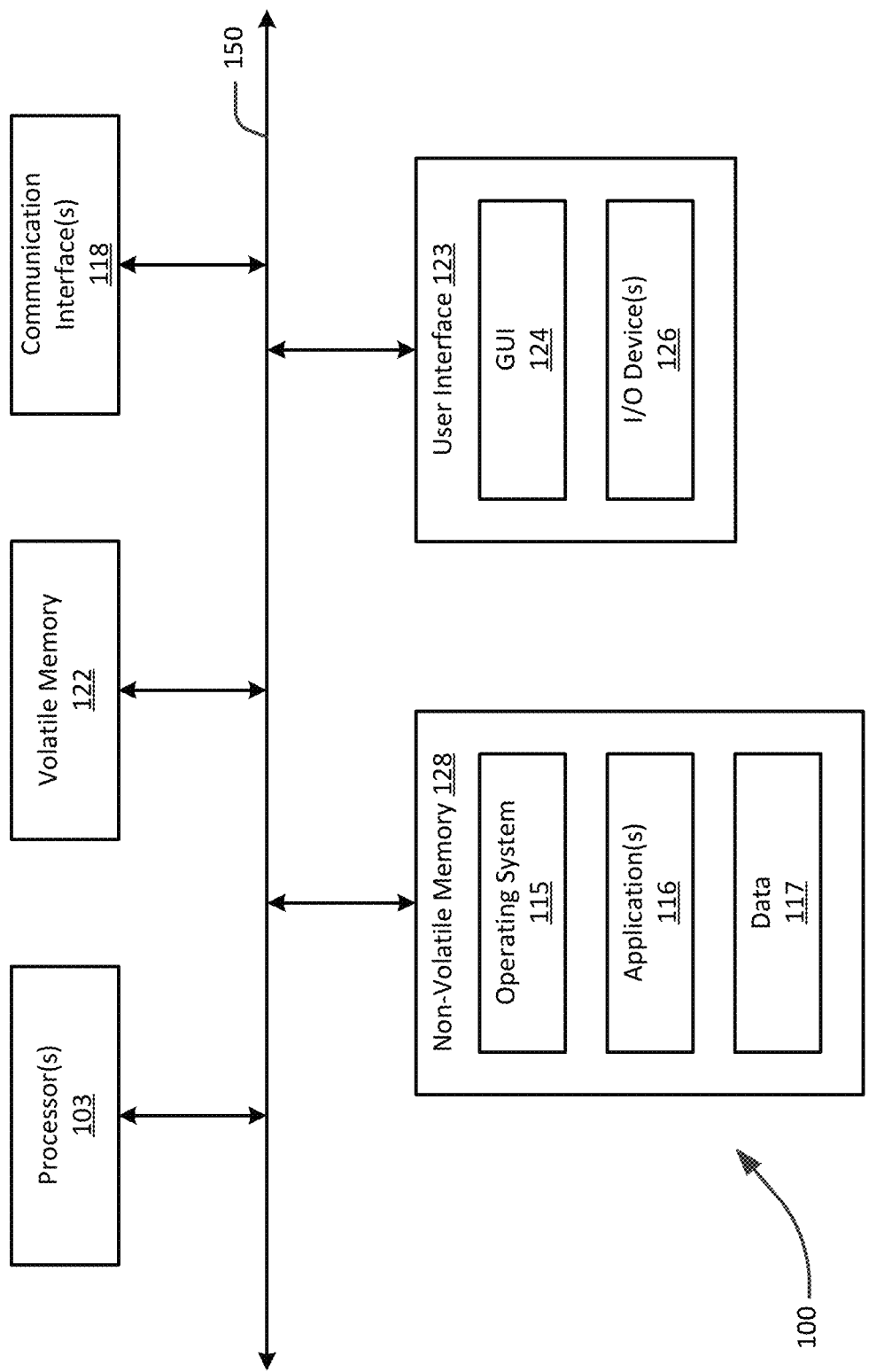
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
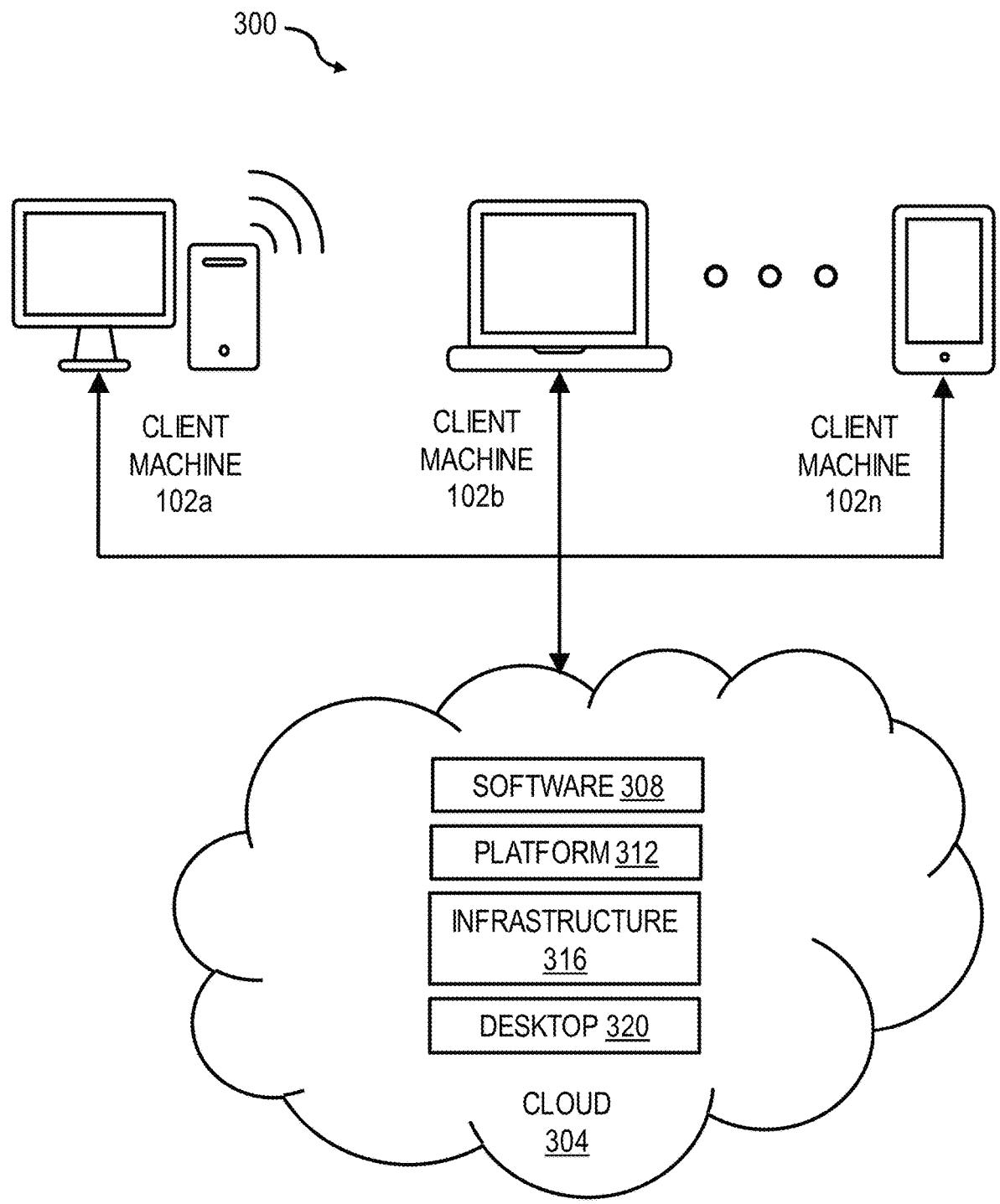
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
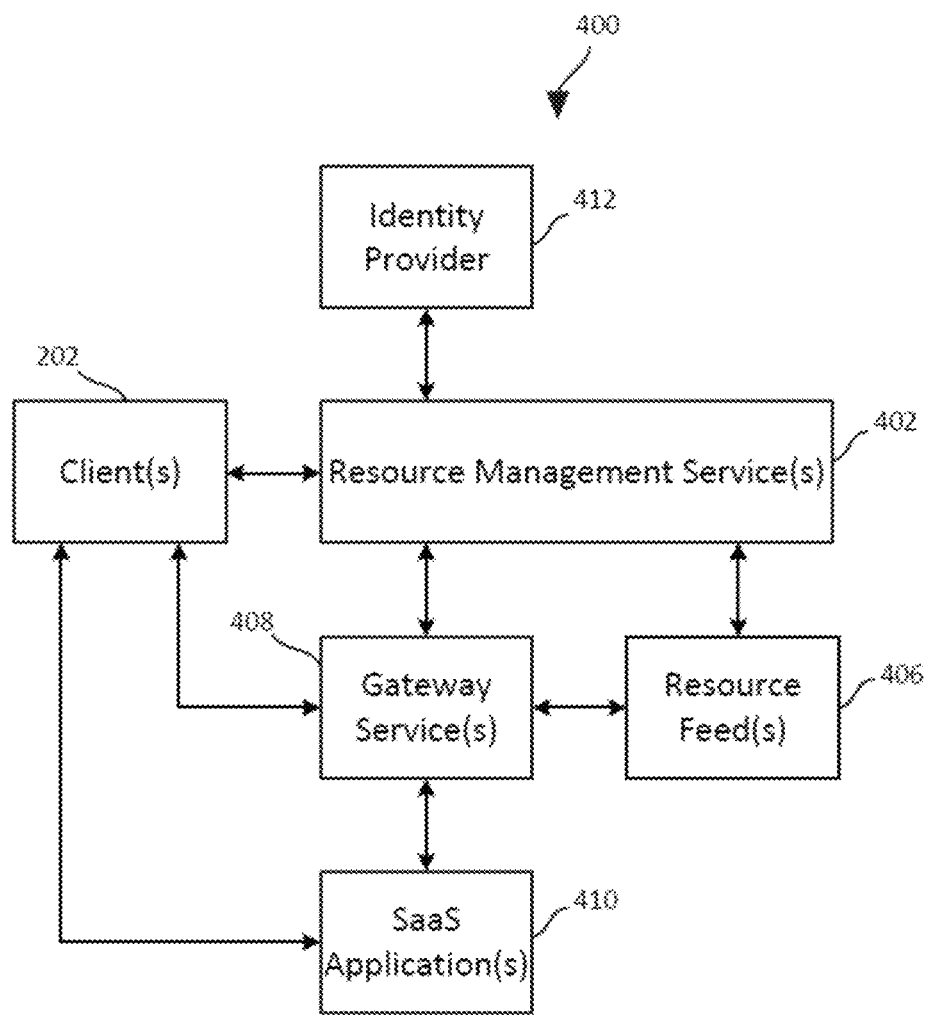
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
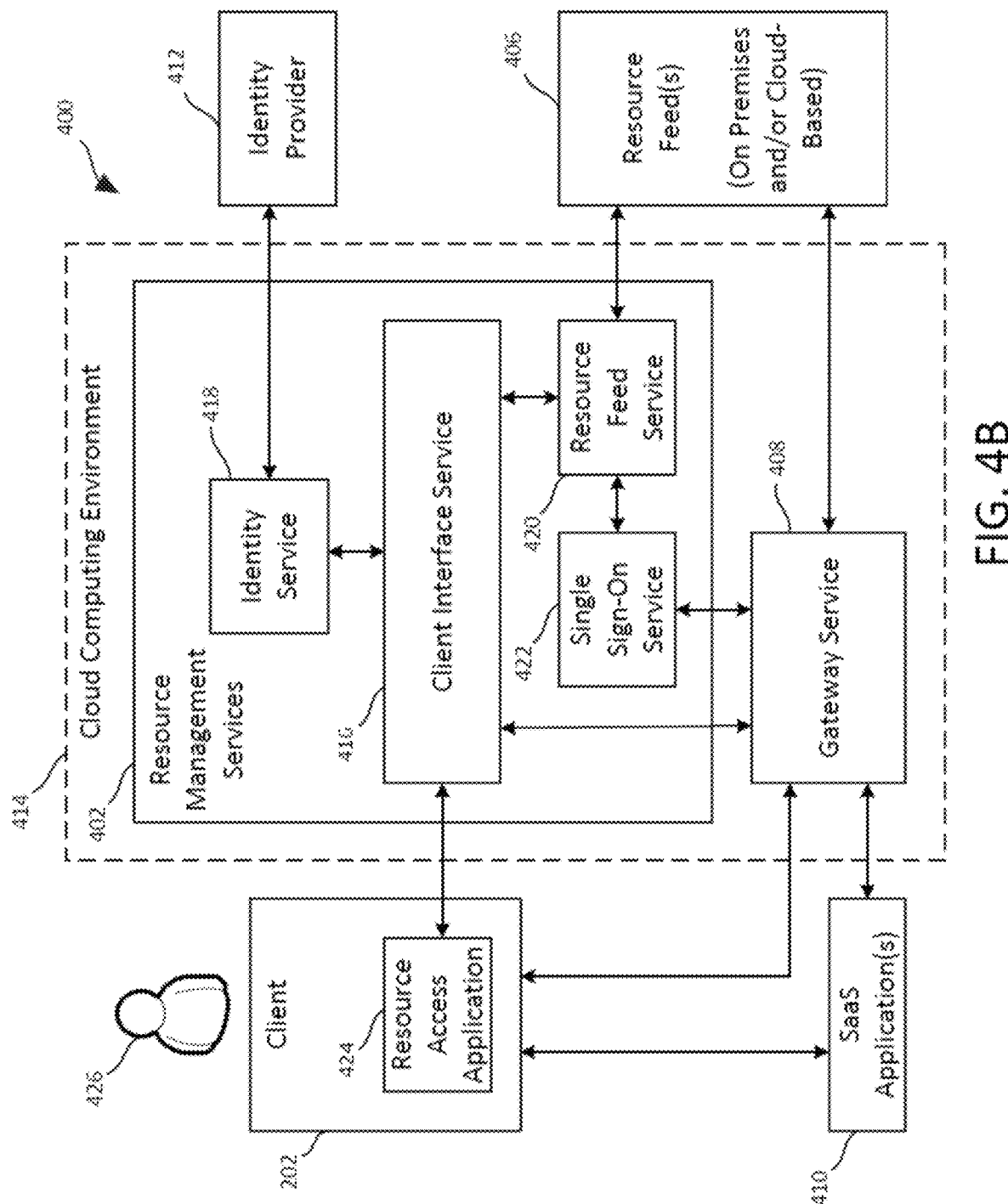
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
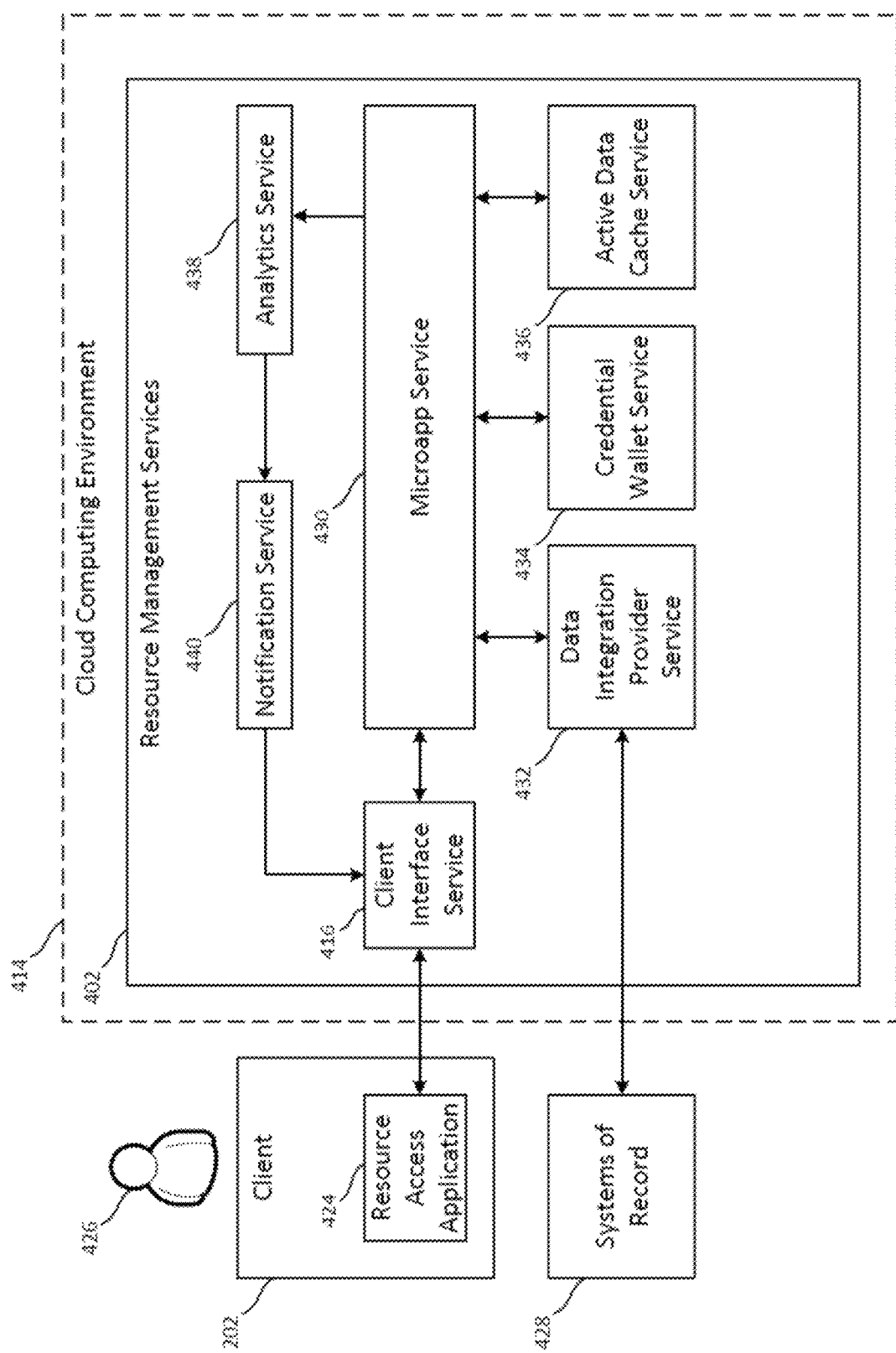
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figures 5A, 5B:
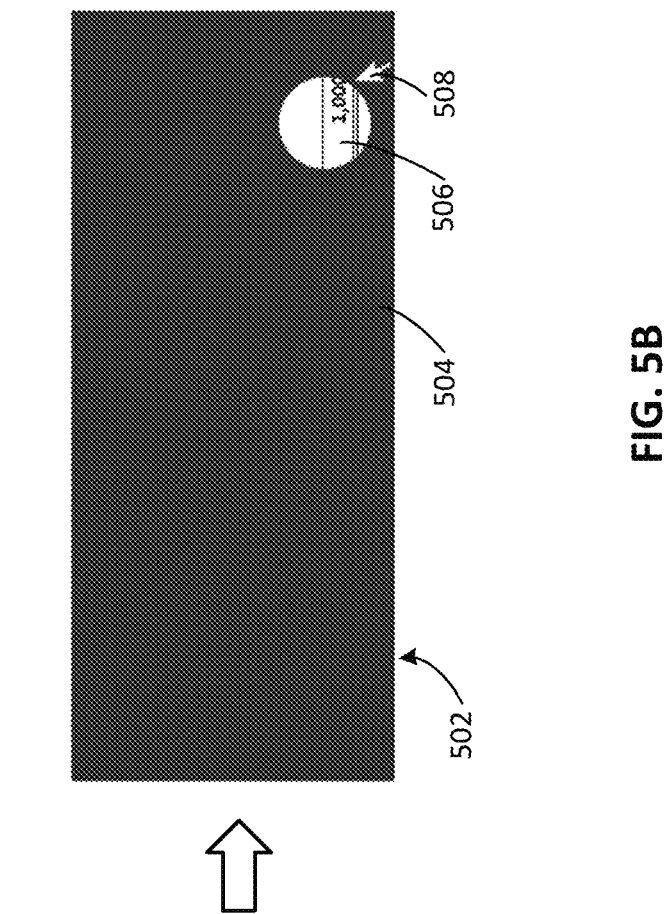
FIG. 5A shows example content being shown on a display.
FIG. 5B shows a mask applied over the content on the display of FIG. 5A, in accordance with an embodiment of the present disclosure.

FIG. 5A shows content 502 on a display while FIG. 5B shows a mask 504 applied over content 502 on the display, in accordance with an embodiment of the present disclosure. Mask 504 includes a window (or opening) 506 through which a portion of content 502 below mask 504 and located within window 506 is visible through window 506. However, a portion of content 502 below mask 504 and located outside window 506 is not visible because of mask 504.

In some embodiments, a client application, such as resource access application 424, an application accessible using resource access application 424, or any other suitable client application, may be programmed or otherwise configured to generate and apply mask 504 over content 502 being displayed on the display. In some cases, the client application may display (render) content 502 within a window, such as, for example, an application window or a browser window, on the display. In such cases, the client application can generate and apply mask 504 over content 502 being shown in the window in response to launching or generating the window on the display. For example, a user of the client application may have enabled a security cover feature for applying a mask, such as mask 504, over a window of the client application in a configuration file. In other implementations, the client application can generate and apply mask 504 over content 502 within the window on the display in response to receiving an indication of a user interface control element (e.g., GUI button) being activated and/or a hotkey being pressed. In any case, the client application can provide functionality that allows its user to enable and disable the applying of a mask (security cover feature) over the content being shown in a window on the display. For example, the user interface control element and/or hotkey may function as a toggle for enabling and disabling the generating and applying of a mask. Likewise, in the case of the use of a configuration file, the user can disable the security cover feature in the configuration file.

With reference to FIG. 5A, the client application may display content 502 on a display of a client device for viewing by a user. Content 502 being displayed or otherwise presented on the display may include sensitive information. For example, as can be seen in FIG. 5A, content 502 may be information regarding the August 2019 payslip of an employee named "Rajesh Gowda." As some of content 502 may be is sensitive information (e.g., Employee Name, Gender, dollar amounts, etc.), the user may enable or otherwise enable the security cover feature provided by the client application. In response to receiving an indication of the enabling of the security cover feature, for example, via an indication in a configuration file or an activation of user interface control element or pressing of a hotkey, the client application can generate and apply mask 504 over content 502, as shown in FIG. 5B. As noted above, in some cases, the client application may display content 502 within a window rendered on the display.

With reference to FIG. 5B, in cases where content 502 is displayed within a window, the client application can determine the size and position of the window within a screen of the client device on which the window is being displayed. For example, the size and position may be determined from the properties of the application displaying the window. For example, the size of the window may be represented by a width and a height, and the position within the screen may be represented by x-y coordinates of the corners and/or edges of the window. The client application can then generate mask 504 to match the determined size of the window and apply mask 504 over content 502 in the window based on the determined position of the window such that mask 504 effectively prevents viewing of content 502 in the underlying window except through window 506 included in mask 504. For example, as can be seen in FIG. 5B, mask 504 prevents the user from viewing the details of the August 2019 payslip of Rajesh Gowda except for the portion of the payslip that is viewable through window 506 (e.g., the text "1,000"). Note that content 502 viewable through window 506 is without context. That is, a passerby who may happen to view the portion of content 502 shown through window 506 would not know what content 502 is in reference to. For example, the passerby would not know that the "1,000" viewable through window 506 is in reference to the total deductions in Rajesh Gowda's August 2019 pay. However, the user of the client application would know the context of the portion of content 502 shown through window 506 since the user can move window 506 to view and read the individual pieces or portions of content 502 being shown in the underlying window on the display. For example, by moving window 506 to view and read the individual pieces of content 502, the user would know that the "1,000" viewable through window 506 is in reference to the total deductions in Rajesh Gowda's August 2019 pay. In this manner, mask 504 provides security and protection content 502, including the sensitive information included in content 502, being shown in the underlying window on the display while still allowing the user to view and read content 502 using window 506.

The client application may be configured to track or detect changes in the size and/or position of a window within which content 502 is being displayed. In response to a change in the size and/or position of the window, the client application may be configured to adjust the size and/or position of mask 504 (i.e., resize and/or reposition mask 504) to be synchronized with the window such that mask 504 continues to effectively prevent viewing of content 502 within the underlying window except through window 506. For example, in an implementation, the client application can track or detect changes in the size and/or position of the window by monitoring the memory locations where such size and position information are stored. In some cases, the client application may adjust the size of window 506 when adjusting the size of mask 504. In an implementation, the client application may continually and/or periodically check for changes to the size and/or position of the underlying window to determine whether the size and/or position of mask 504 needs adjustment.

Still referring to FIG. 5B, the client application may be configured to initially position window 506 within mask 504 based on a location of a pointer or cursor of a pointing device on the screen on which content 502 is being displayed. For example, as can be seen in FIG. 5B, the client application can initially position window 506 at or proximate to the location of a pointer 508. In cases where pointer 508 may be located outside of mask 504, the client application may initially position window 506 at a preconfigured position (e.g., a default initial position specified in a configuration file) in mask 504.

The client application may be configured to size window 506 in mask 504 to be a finite size based on parameters and settings in the configuration file. For example, the user may specify the shape (e.g., circle, rectangle, square, oval, etc.) and size (e.g., diameter, width and height, percentage of mask 504, etc.) for window 506 in the configuration file. The user may also specify an initial position for window 506 (e.g., x-y coordinates within mask 504 at which to position window 506) in the configuration file. In an implementation, the client application can provide default values for such parameters and settings in the configuration file.

In some embodiments, the client application may be configured to size window 506 in mask 504 to be a finite size based on a font size of text characters in content 502 being displayed on the display. For instance, in the case where content 502 is a web page, the client application can determine a type of font and font size from the HTML or cascading style sheets (CSS) code. For other types of content, such as, for example, an image, the client application can use optical character recognition (OCR) or pattern recognition to determine a type of font and font size. For instance, OCR may be used to convert the image of content 502 to textual data. In an embodiment, the client application can generate a smaller sized window 506 for a smaller font size and a larger sized window 506 for a larger font size. Sizing window 506 based on the determined font size allows for generating window 506 that is not too large so as to display too much of content 502 below mask 504 to reduce the effectiveness of mask 504.

In some embodiments, the client application may be configured to dynamically adjust the size of window 506 in mask 504 based on the individual pieces or items of content. For instance, in the case of text content, the client application may recognize or otherwise determine the relative lengths of the words (e.g., very long word, very short word, or normal length word) included in content 502 and dynamically size window 506 based on the relative length of a word that is to be within window 506 to allow the word to be viewable through window 506. It may thus be said that the client application provides a dynamic window of variable size in relation to content 502.

In some embodiments, the client application may be configured to size window 506 in mask 504 to be a finite size based on a size of a window within which content 502 is being displayed. For instance, in an implementation, the client application can generate window 506 according to the parameters and settings specified in the configuration file. The client application can then check to determine whether the size of window 506 exceeds a preconfigured maximum allowable percentage, such as, for example, 5%, 6%, 8%, or other suitable percentage, of the size of the window showing content 502. If the size of window 506 exceeds the preconfigured maximum allowable percentage, the client application can appropriately adjust the size of the window 506 to be within the preconfigured maximum allowable percentage of the size of the window showing content 502.

In some embodiments, the client application may be configured to size window 506 in mask 504 to be a finite size based on whether content 502 is likely to include sensitive information. In an implementation, the client application can determine whether content 502 is likely to include sensitive information based on the application or type of application that is displaying content 502 on the display. To this end, the client application may maintain a list of applications or types of applications that are likely to display content that is likely to include sensitive information, such as payroll applications, accounting applications, finance applications, product design applications, project management applications, and authentication applications, to name a few examples. Then, if the content being displayed on the display is from or otherwise provided by an application or type of application that is in the list, the client application can determine that the content is likely to include sensitive information. For example, the user may configure multiple windows 506 in the configuration file, including a first finite sized window 506 to be used for content likely to include sensitive information and a second finite sized window 506 to be used for content not likely to include sensitive information. Client application can then generate window 506 to be of the first finite size in response to determining that the content being displayed on the display is likely to include sensitive information, and generate window 506 to be of the second finite size in response to determining that the content being displayed on the display is not likely to include sensitive information.

In some embodiments, the client application may be configured to size window 506 in mask 504 to be a finite size based on the application or type of application that is providing content 502 being displayed on the display. In an implementation, the client application can determine the application type from information contained in the configuration file. For example, the user may specify one or more categories (types) of applications and, for individual categories, a list of one or more applications. The user may also configure a specific window 506 for the different categories of application in the configuration file. The client application can then determine the application category (type) from the configuration file and generate window 506 to be of a finite size, etc., according to the configuration specified for the application category.

In some embodiments, the client application may be configured to magnify the content that is viewable through window 506. For example, the client application can enlarge content 502 that is viewable through window 506. Enlarging content 502 may assist the user to better see the text and images through window 506.

In some embodiments, the client application may be configured to apply mask 504 over content 502 being displayed on the display in response to a determination that content 502 or a portion of content 502 being shown on the display includes sensitive information. In an implementation, the client application can utilize an optical character recognition/data loss prevention (OCR/DLP) technique or service to determine whether content 502 being shown on the display includes sensitive information. Content 502 may be in a text-based format (e.g., textual data) or an image-based format (e.g., an image of the content). In the case of an image, the OCR/DLP technique or service may use optical character recognition (OCR) to convert the image of content 502 to textual data. It will be appreciated that other methods/techniques of text extraction may also be used (e.g., textual data may be embedded in the content and extracted). In any case, OCR/DLP technique or service may scan content 502 to determine whether content 502 includes items of sensitive information.

For example, the OCR/DLP technique or service may scan the textual data for certain keywords or phrases, and/or search the textual data using regular expressions, for patterns of characters to identify items of sensitive information contained in content 502. Non-limiting examples of sensitive information include any data that could potentially be used to identify a particular individual (e.g., a full name, Social Security Number, driver's license number, bank account number, passport number, and email address), financial information regarding an individual/organization, and information deemed confidential by the individual/organization (e.g., contracts, sales quotes, customer contact information, phone numbers, personal information about employees, and employee compensation information). Other pattern recognition techniques may be used to identify items of sensitive information.

Additionally or alternatively, as described previously, the client application can determine whether content 502 includes sensitive information based on the application or type of application that is providing the content. For example, the client application may maintain a list of applications or types of applications that are likely to provide content that include sensitive information. Then, if the content is from or otherwise provided by an application or type of application that is in the list, the client application can determine that the content includes sensitive information.

In some embodiments, the client application may be configured to move window 506 within mask 504 based on the location of a pointer or cursor of a pointing device. This allows the user to use the pointing device to view the entirety of content 502 being displayed on the display by moving window 506 over content 502. In an embodiment, the client application may provide line markers or a grid on mask 504 to help guide the user through the content (i.e., assist the user in read and/or view content 502).

In some embodiments, the client application may be configured to move window 506 within mask 504 based on eye focus location of a user viewing the display. In an implementation, the client application can utilize an eye tracking technique or service to determine the user's eye focus location in mask 504 and move window 506 based on the determined location. Moving window 506 based on the eye focus location of the user will be further described with respect to FIGS. 8-10.

Figure 6:
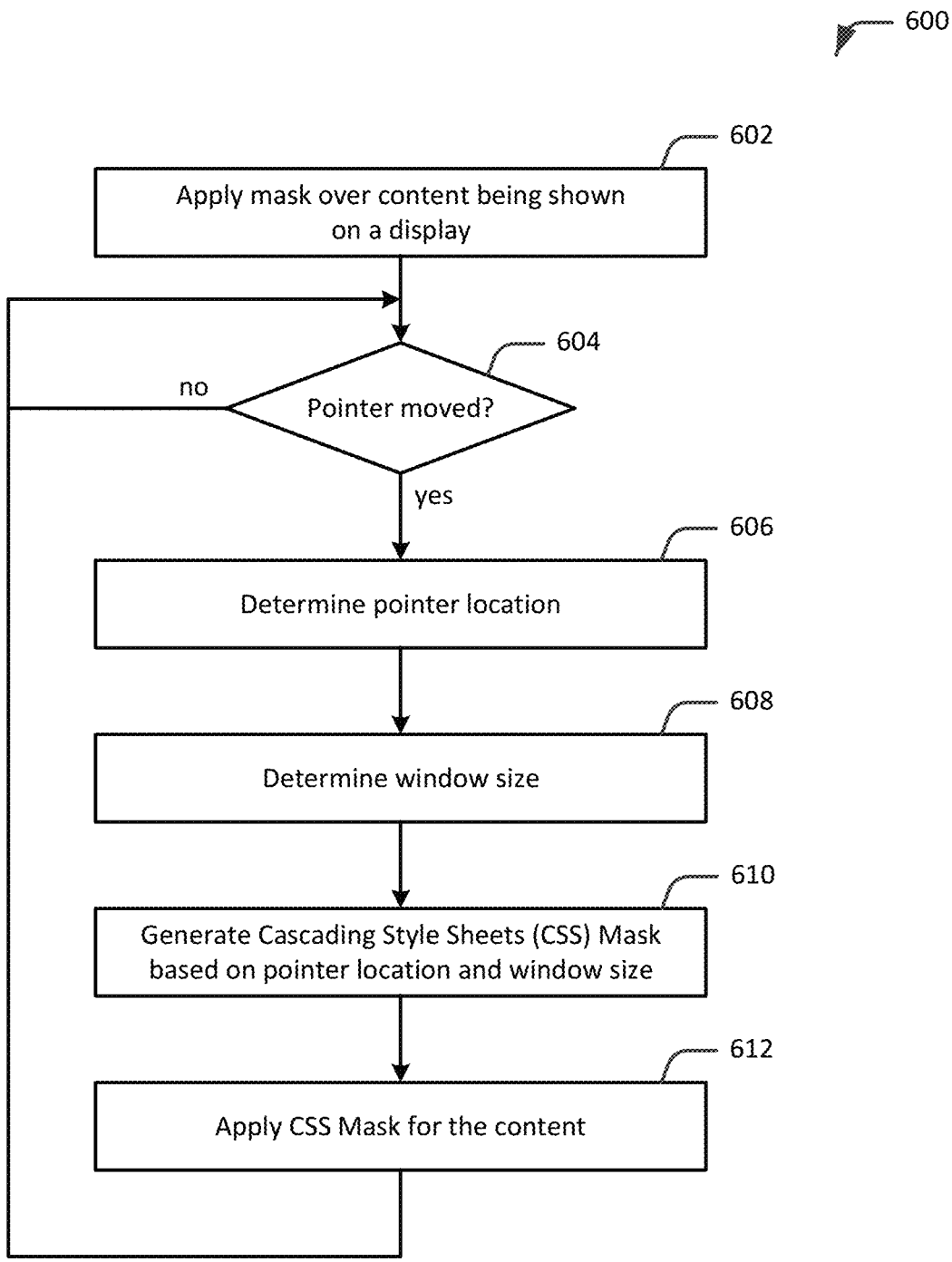
FIG. 6 is a flow diagram of an example process for applying a mask over content being displayed on a display and moving a window based on detected pointer location, in accordance with an embodiment of the present disclosure.

FIG. 6 is a flow diagram of an example process 600 for applying a mask over content being displayed on a display and moving a window based on detected pointer location, in accordance with an embodiment of the present disclosure. Example process 600, and example process 900 further described below, may be implemented or used within a computing environment or system such as those disclosed above at least with respect to FIG. 1, FIG. 2, FIG. 3, and/or FIGS. 4A-4C. For example, in some embodiments, the operations, functions, or actions illustrated in example process 600, and example process 900 further described below, may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102*a*-102*n* of FIG. 3 and/or clients 202 of FIGS. 4A-4C). For example, the operations, functions, or actions described in the respective blocks of example process 600, and example process 900 further described below, may be implemented by applications 116 and/or data 117 of computing device 100.

With reference to FIG. 6, although the following description of process 600 may refer to a browser application and a CSS mask, it is appreciated herein that process 600 can be applied to other types of client applications and techniques for overlaying content being displayed on a display. Process 600 may be implemented by a browser application to position a window within a mask based on pointing device pointer location.

At 602, the browser application may apply a mask over content being shown within a browser window on a display. For example, a user may use the browser application to view the contents of a web page. When displaying the contents, the browser application may apply the mask over the contents in the browser window. The mask may include a finite size window at a first location in the mask to allow the user to view portions of the content in the underlying browser window located within the window.

At 604, the browser application may determine whether there is movement in the pointer location. In an implementation, the browser application can detect movement in the pointer location by monitoring the MouseMove event. MouseMove events are generated continually as the mouse pointer moves across objects. If there is no movement in the pointer, the browser application may continue to monitor for movement in the location of the pointer.

Otherwise, if there is movement in the location of the pointer, then, at 606, the browser application may determine a location (new location) of the pointer. For example, to view the content in the underlying browser window that is not viewable because of the mask, the user may use a pointing device to move the pointer from the first location in the content or over the mask to a second location in the content or over the mask. In an implementation, the browser application may determine the x-y coordinates of the second location within the content or relative to the mask.

At 608, the browser application may determine a size for the window to be included in the mask. As described previously, the mask may be determinable based on the browser window that includes the content in which to apply the mask. In an implementation, the browser application may determine a size based on parameters and settings in a configuration file.

At 610, the browser application may generate a mask based on the pointer location determined at 606 and the window size determined at 608. In an implementation, the browser application can generate a CSS Mask based on the pointer location and the determined window size. As is generally known, CSS Masks can be used to overlay content with a pattern that can be used to knock out (e.g., clip) portions of the content that is outside the window in the final display of the content.

At 612, the browser application may apply the mask over the content. For example, the browser application can apply a CSS Mask for the content in the underlying browser window so that content located within the window is viewable through the window, and content outside the window is not viewable because of the mask.

The browser application may then continue to monitor for movement in the location of the pointer at 604 and repeat the operations of 604-612 as necessary to allow other portions or the remainder of the content to be viewed.

Figure 7:
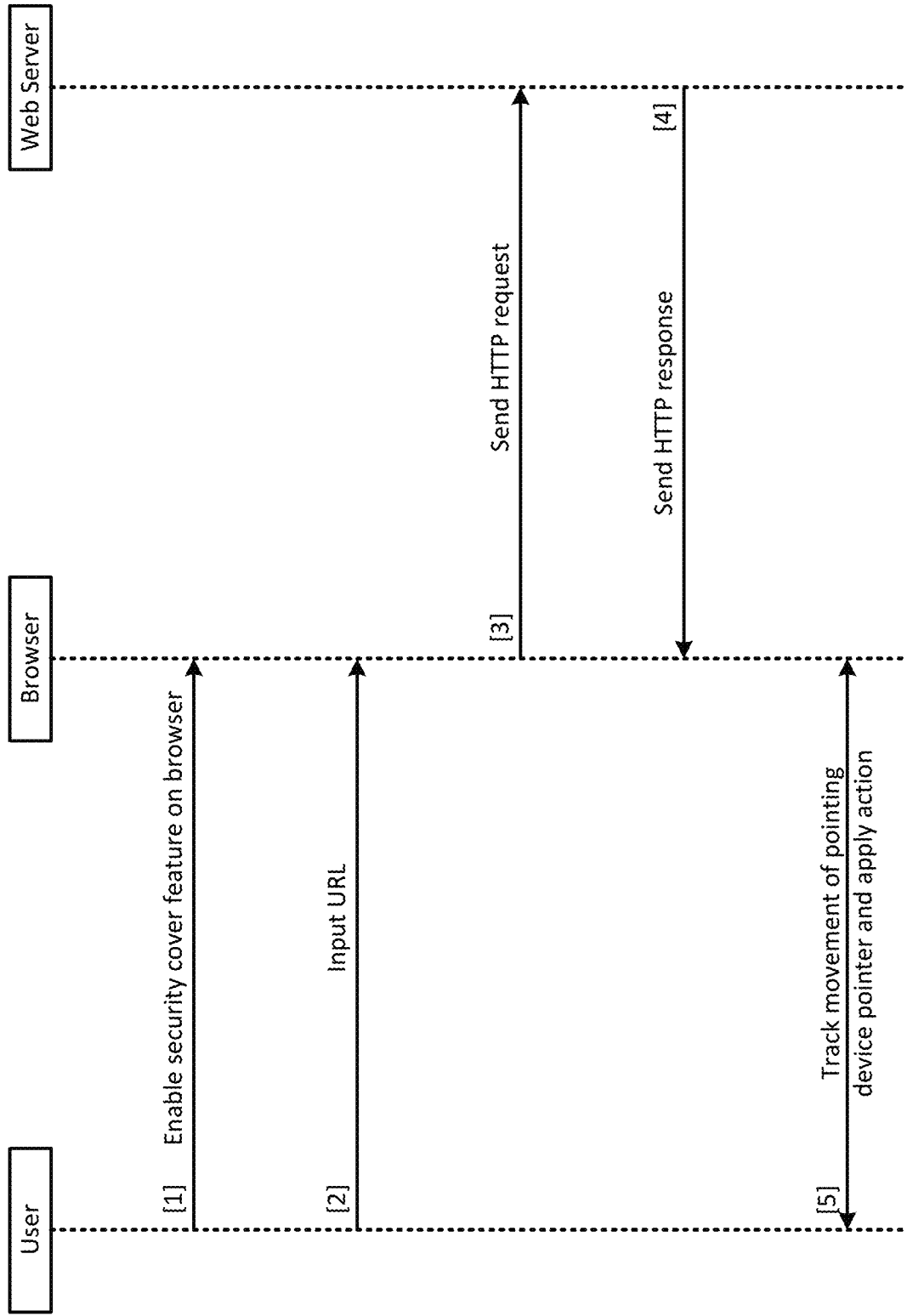
FIG. 7 is a sequence diagram illustrating various interactions between selected components to operate a mask based on a pointing device pointer location, in accordance with an embodiment of the present disclosure.

FIG. 7 is a sequence diagram illustrating various interactions between selected components to operate a mask based on a pointing device pointer location, in accordance with an embodiment of the present disclosure. For example, a user may use a browser application to access a web page whose contents might include sensitive information. Before accessing the web page, the user may enable [1] a security cover feature on the browser application. Enabling the security cover feature causes the browser application to generate and apply a mask over contents shown in a browser window generated by the browser application.

The user may then input [2] a URL of the web page into the browser application to access the web page. In response to the input of the URL, the browser application may send [3] a HTTP request to a web server for the contents of the web page. In response to the HTTP request, the web server may send [4] a HTTP response that contains the requested contents to the browser application. The browser application may display the contents of the web page in a browser window. The browser application may also generate and apply a mask that includes a window over the contents being shown in the browser window. The browser application may then track [5] the movement of the pointing device pointer and move the window based on the location of the pointer in the mask.

Figure 8:
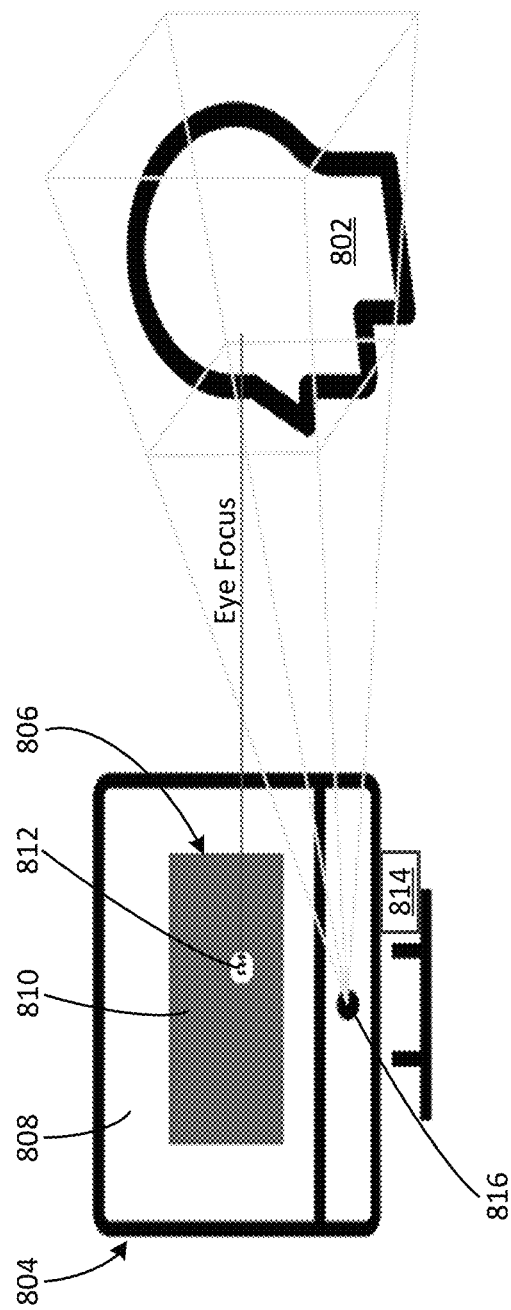
FIG. 8 is a diagram showing an implementation utilizing an eye tracker to position a window in a mask, in accordance with an embodiment of the present disclosure.

FIG. 8 is a diagram showing an implementation utilizing an eye tracker to position a window in a mask, in accordance with an embodiment of the present disclosure. As shown, a user 802 may execute a client application on a client device 804 to view content in a window 806 of the client application on a screen 808. To protect sensitive information in the content, the client application may generate and apply a mask 810 having a window 812 over the content being shown in window 806. Mask 810 and window 812 may be similar to mask 504 and window 506, respectively, described previously. The client application can utilize eye tracking to determine an eye focus location of user 802 and move window 812 based on the determined eye focus location to allow user 802 to view the content being shown in underlying window 806.

In an implementation, the client application can utilize an eye tracker 814 to determine the eye focus location of user 802. As shown in FIG. 8, eye tracker 814 can use a webcam 816 attached to client device 804 to measure the eye positions and eye movements of user 802. Based on the measured information, eye tracker 814 can determine a point of gaze or eye focus location of user 802. The concept of eye tracking is well understood in the field of human-computer interaction and will not be discussed in detail here. However, for purposes of this discussion, it is sufficient to understand that eye tracker 814 may operate to determine the eye focus location in screen 808 and, in particular, mask 810, of user 802.

Figure 9:
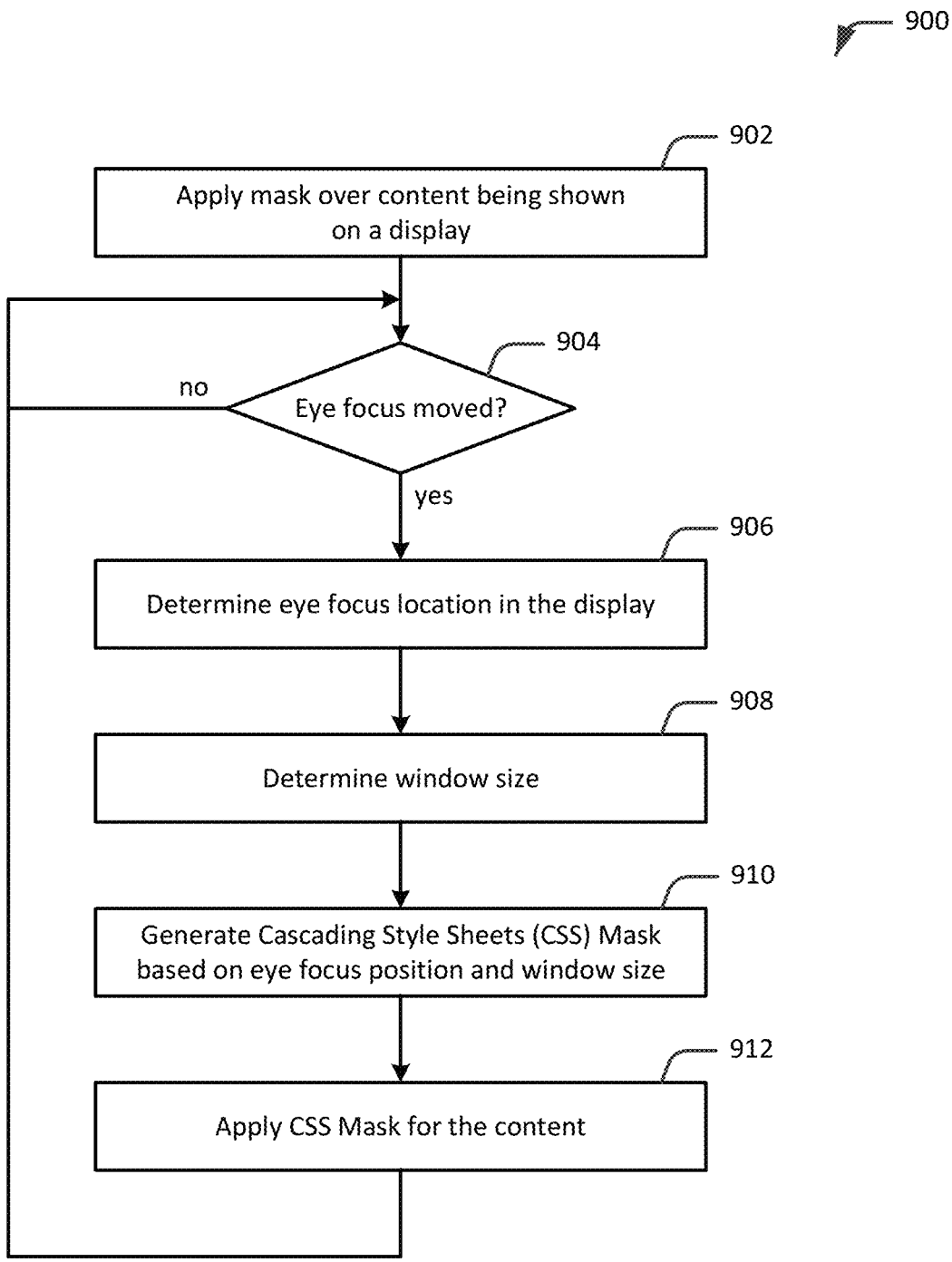
FIG. 9 is a flow diagram of an example process for applying a mask over content being displayed on a display and moving a window based on detected eye focus location, in accordance with an embodiment of the present disclosure.

FIG. 9 is a flow diagram of an example process 900 for applying a mask over content being displayed on a display and moving a window based on detected eye focus location, in accordance with an embodiment of the present disclosure. Certain operations in process 900 are similar to operations described previously with respect to process 600 of FIG. 6. The previous relevant discussion with respect to operations in process 600 of FIG. 6 that are similar in process 900 of FIG. 9 are equally applicable here, including the previous relevant discussion with respect to operations at 602, 608, and 612. Also, similar to the description of process 600, although the following description of process 900 may refer to a browser application and a CSS mask, it is appreciated herein that process 900 can be applied to other types of client applications and techniques for overlaying content being displayed on a display. Process 900 may be implemented by a browser application to position a window within a mask based on eye focus location of a user.

At 902, the browser application may apply a mask over content being shown within a browser window on a display. For example, a user may use the browser application to view the contents of a web page.

At 904, the browser application may determine whether there is movement in the user's eye focus. In an implementation, the browser application can use an eye tracker to detect movement in the user's eye focus. If there is not movement in the user's eye focus, the browser application may continue to monitor for movement in the user's eye focus.

Otherwise, if there is movement in the user's eye focus, then, at 906, the browser application may determine the user's eye focus location (new eye focus location) in the mask. For example, to view the content in the underlying browser window that is not viewable because of the mask, the user may move his or her eyes to move the eye focus from the first location in the mask to a second location in the mask.

At 908, the browser application may determine a size for the window to be included in the mask. At 910, the browser application may generate a mask based on the eye focus location determined at 906 and the window size determined at 908. In an implementation, the browser application can generate a CSS Mask based on the pointer location and the determined window size.

At 912, the browser application may apply the mask over the content. The browser application may then continue to monitor for movement in the user's eye focus at 904 and repeat the operations of 904-912 as necessary to allow other portions or the remainder of the content to be viewed.

Figure 10:
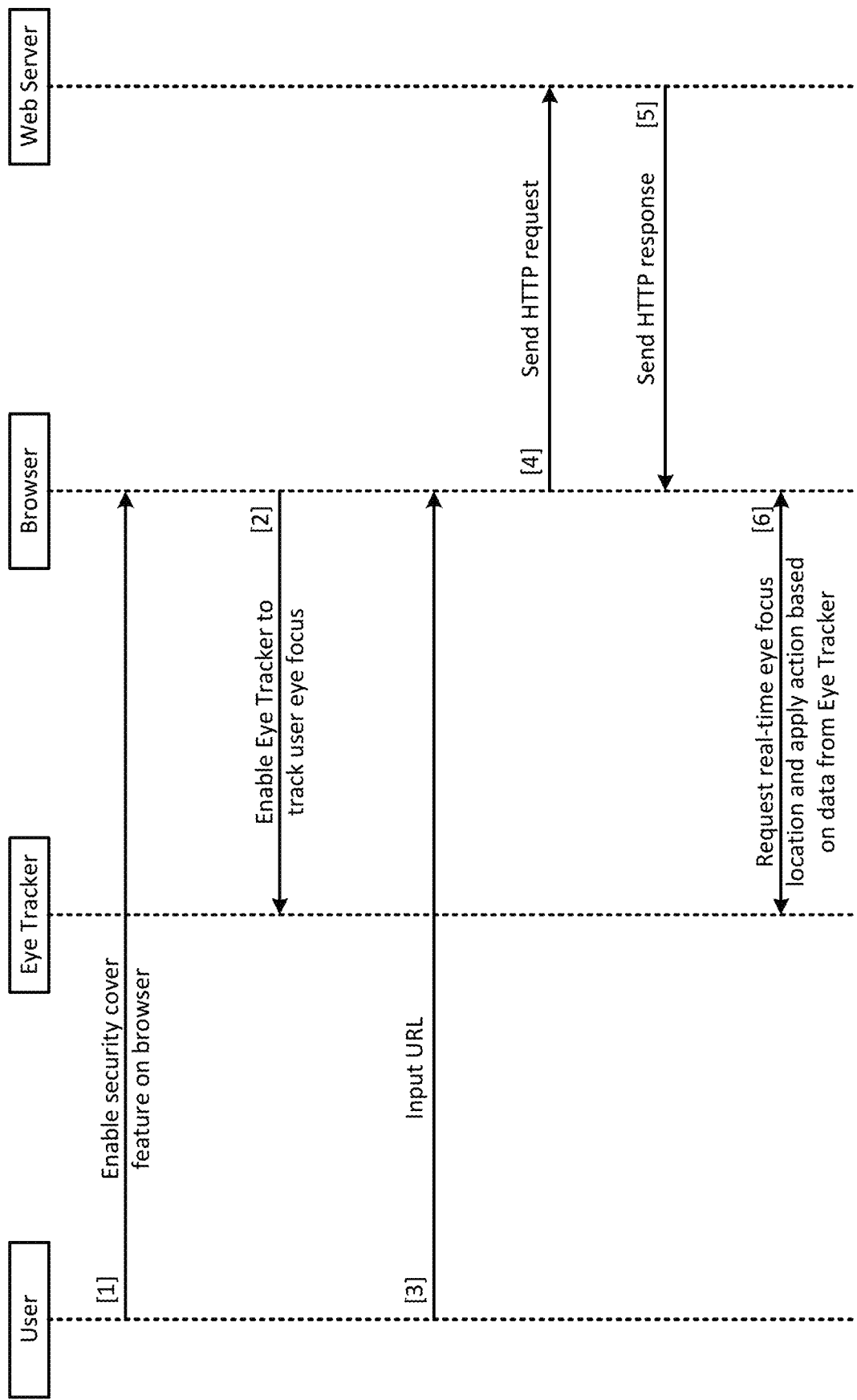
FIG. 10 is a sequence diagram illustrating various interactions between selected components to operate a mask based on eye focus location, in accordance with an embodiment of the present disclosure.

FIG. 10 is a sequence diagram illustrating various interactions between selected components to operate a mask based on eye focus location, in accordance with an embodiment of the present disclosure. For example, a user may use a browser application to access a web page whose contents might include sensitive information. Before accessing the web page, the user may enable [1] a security cover feature on the browser application. Enabling the security cover feature causes the browser application to generate and apply a mask over contents shown in a browser window generated by the browser application. In response to enabling of the security cover feature, the browser application may enable [2] an eye tracker to track the user's eye focus.

The user may then input [3] a URL of the web page into the browser application to access the web page. In response to the input of the URL, the browser application may send [4] a HTTP request to a web server for the contents of the web page. In response to the HTTP request, the web server may send [5] a HTTP response that contains the requested contents to the browser application. The browser application may display the contents of the web page in a browser window. The browser application may also generate and apply a mask that includes a window over the contents being shown in the browser window.

The browser application may then request [6] the eye tracker to provide real-time data regarding the user's eye focus location. The browser application may then move the window in the mask based on the eye focus location data provided by the eye tracker.

Further Example Embodiments

The following examples pertain to further embodiments, from which numerous permutations and configurations will be apparent.

Example 1 includes a method including: receiving, by a computing device, content for display on a display of the computing device; generating, by the computing device, a mask for display over the content within the display, the mask including a window so that a portion of the content located within the window is viewable via the display, and content outside the window is not viewable via the display; and, applying, by the computing device, the mask over the content so that the content can be read by moving the window over the content to display individual pieces of the content without display of the content in its entirety.

Example 2 includes the subject matter of Example 1, wherein generating the mask including a window comprises generating a cascading style sheets (CSS) mask for the display based on a location of a cursor within the display.

Example 3 includes the subject matter of Example 1, wherein generating the mask including a window comprises generating a CSS mask for the display based on an eye focus location of a user viewing the display.

Example 4 includes the subject matter of any of Examples 1 through 3, wherein applying the mask over the content comprises applying a CSS mask on the display.

Example 5 includes the subject matter of any of Examples 1 through 4, wherein applying the mask is in response to a determination that the content includes sensitive information.

Example 6 includes the subject matter of Example 5, wherein the determination that the content includes sensitive information is via optical character recognition/data loss prevention (OCR/DLP).

Example 7 includes the subject matter of any of Examples 1 through 6, wherein the display is a browser window.

Example 8 includes the subject matter of any of Examples 1 through 7, wherein the window is of a finite size that is based on a size of the display.

Example 9 includes the subject matter of any of Examples 1 through 7, wherein the window is of a finite size that is based on a type of content on the display.

Example 10 includes the subject matter of any of Examples 1 through 9, further including moving the window in the mask from a first location in the mask to a second location in the mask.

Example 11 includes the subject matter of Example 10, wherein moving the window in the mask is in response to detecting a location of a cursor at or proximate to the second location.

Example 12 includes the subject matter of Example 10, wherein moving the window in the mask is based on an eye focus location of a user viewing the display.

Example 13 includes a system including a memory and one or more processors in communication with the memory and configured to: receive content for display on a display; generate a mask for display over the content within the display, the mask including a window so that a portion of the content located within the window is viewable via the display, and content outside the window is not viewable via the display; and apply the mask over the content so that the content can be read by moving the window over the content to display individual pieces of the content without display of the content in its entirety.

Example 14 includes the subject matter of Example 13, wherein to generate the mask including a window comprises to generate a cascading style sheets (CSS) mask for the display based on one of: a location of a cursor within the display or an eye focus location of a user viewing the display.

Example 15 includes the subject matter of any of Examples 13 and 14, wherein to apply the mask over the content comprises to apply a CSS mask on the display, wherein the CSS mask is generated for the display based on one of: a location of a cursor within the display or an eye focus location of a user viewing the display.

Example 16 includes the subject matter of any of Examples 13 through 15, wherein the window is of a finite size that is based on one of: a size of the display or a type of content on the display.

Example 17 includes the subject matter of any of Examples 13 through 16, wherein the one or more processors are further configured to move the window in the mask from a first location in the mask to a second location in the mask based on detection of a location of a cursor at or proximate to the second location or an eye focus location of a user viewing the display.

Example 18 includes the subject matter of any of Examples 13 through 17, wherein the display is a browser window.

Example 19 includes a method including: displaying, by a computing device, content on a display of the computing device; generating, by the computing device, a security cover for display over the content within the display, the security cover including a window so that a portion of the content located within the window is viewable via the display, and content outside the window is not viewable via the display; and applying, by the computing device, the security cover over the content so that the content can be read by moving the window over the content to display individual pieces of the content without display of the content in its entirety.

Example 20 includes the subject matter of Example 19, wherein generating the security cover including a window comprises generating a cascading style sheets (CSS) mask for the display based on a determined size for the window and one of: a location of a cursor within the display or an eye focus location of a user viewing the display.

Example 21 includes the subject matter of any of Examples 19 and 20, wherein applying the security cover over the content comprises applying a CSS mask on the display, wherein the CSS mask is generated for the display based on a determined size for the window and one of: a location of a cursor within the display or an eye focus location of a user viewing the display.

Example 22 includes the subject matter of any of Examples 19 through 21, wherein applying the security cover is in response to a determination that the content includes sensitive information.

Example 23 includes the subject matter of Example 22, wherein the determination that the content includes sensitive information is via optical character recognition/data loss prevention (OCR/DLP).

Example 24 includes the subject matter of any of Examples 19 through 23, wherein the display is a browser window.

Example 25 includes the subject matter of any of Examples 19 through 24, wherein the window is of a finite size that is based on a size of the display.

Example 26 includes the subject matter of any of Examples 19 through 24, wherein the window is of a finite size that is based on a type of content on the display.

Example 27 includes the subject matter of any of Examples 19 through 26, further including moving the window in the security cover from a first location in the security cover to a second location in the security cover.

Example 28 includes the subject matter of Example 27, wherein moving the window in the security cover is in response to detecting a location of a cursor at or proximate to the second location.

Example 29 includes the subject matter of Example 27, wherein moving the window in the security cover is based on an eye focus location of a user viewing the display.

Example 30 includes a system including a memory and one or more processors in communication with the memory and configured to: display content on a display; generate a security cover for display over the content within the display, the security cover including a window so that a portion of the content located within the window is viewable via the display, and content outside the window is not viewable via the display; and apply the security cover over the content so that the content can be read by moving the window over the content to display individual pieces of the content without display of the content in its entirety.

Example 31 includes the subject matter of Example 30, wherein to generate the security cover including a window comprises to generate a cascading style sheets (CSS) mask for the display based on a determined size for the window and one of: a location of a cursor within the display or an eye focus location of a user viewing the display.

Example 32 includes the subject matter of any of Examples 30 and 31, wherein to apply the security cover over the content comprises to apply a CSS mask on the display, wherein the CSS mask is generated for the display based on a determined size for the window and one of: a location of a cursor within the display or an eye focus location of a user viewing the display.

Example 33 includes the subject matter of any of Examples 30 and 32, wherein to apply the security cover is in response to a determination that the content includes sensitive information.

Example 34 includes the subject matter of any of Examples 30 and 33, wherein the display is a browser window.

Example 35 includes the subject matter of any of Examples 30 through 34, wherein the window is of a finite size that is based on a size of the display.

Example 36 includes the subject matter of any of Examples 30 through 34, wherein the window is of a finite size that is based on a type of content on the display.

Example 37 includes the subject matter of any of Examples 30 through 36, wherein the one or more processors are further configured to move the window in the security cover from a first location in the security cover to a second location in the security cover.

Example 38 includes the subject matter of Example 37, wherein to move the window in the security cover is in response to detection of a location of a cursor at or proximate to the second location.

Example 39 includes the subject matter of Example 37, wherein to move the window in the security cover is based on an eye focus location of a user viewing the display.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising: receiving, by a computing device, content for display on a display of the computing device; generating, by the computing device, a mask for display over the content within the display, the mask comprising an area that obscures the content and a window, the window is a portion of the mask that does not obscure the content, so that a viewable portion of the content located within the window is viewable through the window, and content outside the window is not viewable via the display; and applying, by the computing device, the mask over the content so that the content can be read by moving the window over the content to display individual pieces of the content without display of the content in its entirety; tracking the eve movement of a user viewing the display to determine a location of focus located within the area of the display covered by the mask; and moving the window to the location of focus so that the viewable portion of the content is within the location of focus.

2. The method of claim 1, wherein generating the mask including a window comprises generating a cascading style sheets (CSS) mask for the display based on a location of a cursor within the display.

3. The method of claim 1, wherein applying the mask over the content comprises applying a CSS mask on the display.

4. The method of claim 1, wherein applying the mask is in response to a determination that the content includes sensitive information.

5. The method of claim 4, wherein the determination that the content includes sensitive information is via optical character recognition/data loss prevention (OCR/DLP).

6. The method of claim 1, wherein the display is a browser window.

7. The method of claim 1, wherein the window is of a finite size that is based on a size of the display.

8. The method of claim 1, wherein the window is of a finite size that is based on a type of content on the display.

9. The method of claim 1, further comprising moving the window in the mask from a first location in the mask to a second location in the mask.

10. A system comprising: a memory; and one or more processors in communication with the memory and configured: receive content for display on a display; generate a mask for display over the content within the display, the mask comprising an area that obscures the content and a window, the window is a portion of the mask that does not obscure the content, so that a portion of the content located within the window is viewable through the window, and content outside the window is not viewable via the display; apply the mask over the content so that the content can be read by moving the window over the content to display individual pieces of the content without display of the content in its entirety; tracking the eve movement of a user viewing the display to determine a location of focus located within the area of the display covered by the mask; and moving the window to the location of focus so that the viewable portion of the content is within the location of focus.

11. The system of claim 10, wherein generating the mask including a window comprises generating a cascading style sheets (CSS) mask for the display based on the location of focus.

12. The system of claim 10, wherein to applying mask over the content comprises applying a CSS mask on the display, wherein the CSS mask is generated for the display based on the display the location of focus.

13. The system of claim 10, wherein the window is of a finite size that is based on one of: a size of the display or a type of content on the display.

14. The system of claim 10, wherein the one or more processors are further configured to move the window in the mask from a first location in the mask to a second location in the mask based on the location of focus.

15. A method comprising: displaying, by a computing device, content on a display of the computing device; generating, by the computing device, a security cover for display over the content within the display, the security cover comprising an area that obscures the content and a window, the window is a portion of the mask that does not obscure the content, so that a portion of the content located within the window is viewable through the window, and content outside the window is not viewable via the display; applying, by the computing device, the security cover over the content so that the content can be read by moving the window over the content to display individual pieces of the content without display of the content in its entirety; tracking the eve movement of a user viewing the display to determine a location of focus located within the area of the display covered by the mask; and moving the window to the location of focus so that the viewable portion of the content is within the location of focus.

16. The method of claim 15, wherein generating the security cover including a window comprises generating a cascading style sheets (CSS) mask for the display based on a determined size for the window and the location of focus.

17. The method of claim 15, wherein applying the security cover over the content comprises applying a CSS mask on the display, wherein the CSS mask is generated for the display based on a determined size for the window and the location of focus.

* * * * *